Oct. 22, 1957    E. SAUER ET AL    2,810,330
ROLLFILM CAMERAS

Filed Jan. 18, 1955    3 Sheets-Sheet 1

Inventors
Edgar Sauer
Werner Zink
by Singer, Stern & Carlberg
Attorneys

Oct. 22, 1957  E. SAUER ET AL  2,810,330
ROLLFILM CAMERAS
Filed Jan. 18, 1955  3 Sheets-Sheet 2
Fig. 2
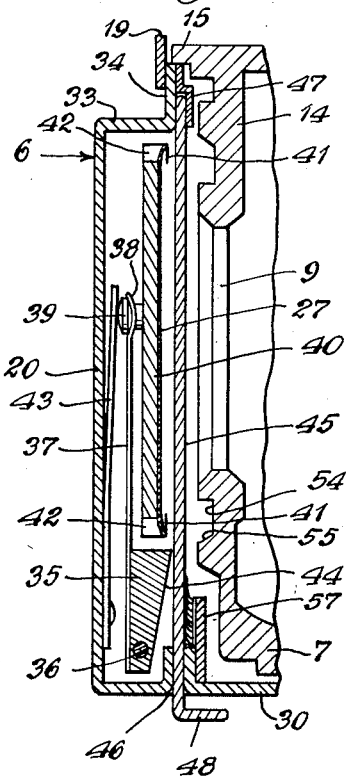
Fig. 4
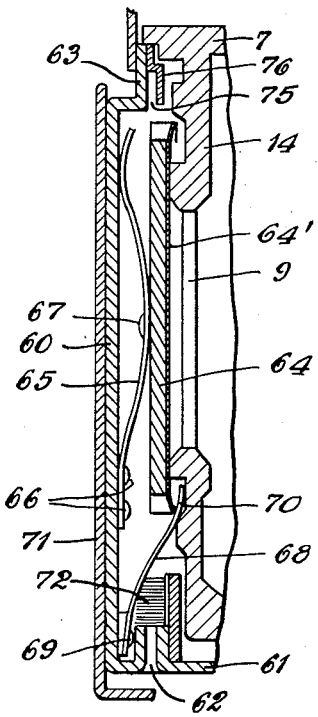
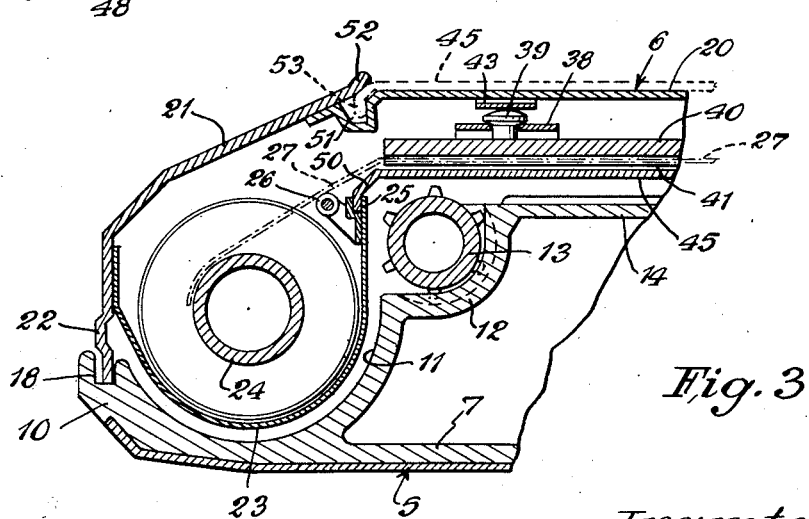
Fig. 3
Inventor
Edgar Sauer
Werner Zink
by Singer, Stern & Carlberg
Attorneys

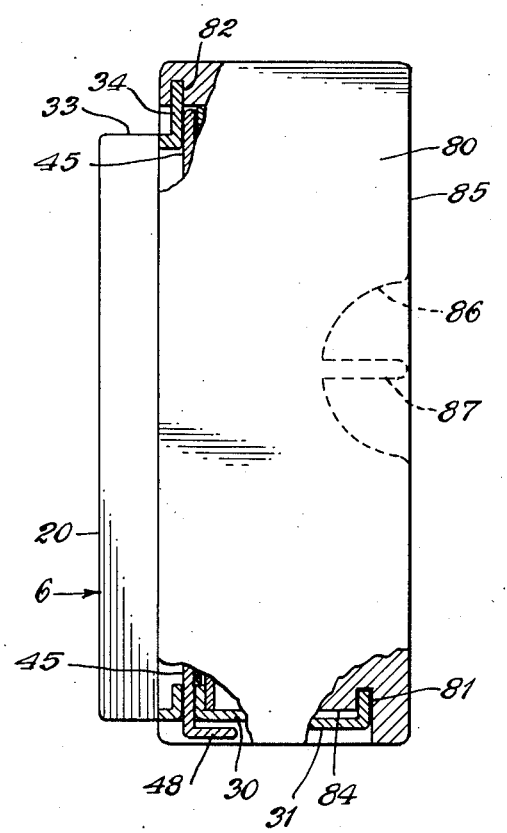

United States Patent Office 2,810,330
Patented Oct. 22, 1957

2,810,330

ROLLFILM CAMERAS

Edgar Sauer, Stuttgart, and Werner Zink, Stuttgart-Bad Cannstatt, Germany, assignors to Zeiss Ikon A. G., Stuttgart, Germany Application January 18, 1955, Serial No. 482,583

Claims priority, application Germany January 26, 1954

3 Claims. (Cl. 95—31)

The present invention relates to improvements in roll film cameras, and more particularly to a roll film camera having a removable and exchangeable magazine or cassette adapted to be closed in an air and light-tight manner to permit the magazine to be removed or interchanged when the same contains roll film with portions thereof exposed.

One object of the invention is to provide a roll film camera having a movably mounted pressure plate which firmly locates the film with respect to the film window in a correct exposure position, and to provide means operable for retracting the pressure plate prior to the removal of the magazine so that the same can be used for quickly changing film material such as, for example, black and white film and a colored film without permitting the exposure of even a small part of the film.

Another object is to provide a roll film camera with a closure plate adapted to be inserted into the removable magazine to retract the film pressure plate, and at the same time close the magazine so that when the same is removed from the camera the film within the magazine will not be exposed to light and thus cause the film to be rendered useless.

Another object is to provide a roll film camera having a removable magazine for accommodating the film rolls, and in addition a pressure plate which is yieldingly urged in the direction of the picture window to hold the film strip in proper relation with respect to the picture film window and the lens system of the camera.

Another object is to provide a magazine closure plate which is adapted to be inserted in the magazine to retract the pressure plate and simultaneously move the film strip away from the picture window prior to the removal of the magazine when the same contains roll film in proper position for exposure.

Another object is to provide a removable magazine for roll film cameras in which the pressure plate is yieldingly urged in a direction toward the picture window of the camera by means of a leaf spring arranged adjacent each end of the plate.

Another object is to provide a removable magazine for a roll film camera having means for guiding the pressure plate into proper relation with respect to the picture window so that the film will be centered with respect to the window and the axis of the optical system.

Another object is to provide a removable magazine for roll film type cameras having a pressure plate which is yieldingly urged toward the picture window and is moved rearwardly by means of a cover plate engaging one or more spring fingers with their free ends extending in front of the pressure plate and overlying the edge of the film strip.

Another object is to provide a removable magazine having an entrance slot for accommodating the closure plate which slot is adapted to be partially closed by means of a flexible light intercepting member located adjacent the slot.

Another object is to provide a cover for the removable roll film magazine to permit the magazine to be stored with a complete roll of film properly arranged in the magazine in such a manner as to exclude light and prevent the film from being damaged by the passage of light thereto.

In production, the camera is formed with a fixed film window for economical reasons, and in view of the fact that a fixed film window is employed, the film traverses the path of the magazine slide when in its proper exposure position. In order to remove the magazine for exchange or other reason, the magazine slide or pressure plate must be retracted so that the film will be moved into the magazine when the cover of the magazine is inserted.

Hitherto, this has been accomplished by retracting the pressure plate by hand by suitable adjusting devices, and by eliminating the looseness of the film produced by the traction power of the spring of the unwinding wheel. Various other means have been employed to accomplish the retraction of the film, but these prior methods are disadvantageous due to the fact that the film is not always retracted properly and when the slide is inserted damage to the film results. Further, the closure slide has been found to engage the edges of the film in the area of the perforations therein which mutilates the film and causes the same to be moved over the picture window so that the same is not in registry therewith.

The above disadvantages are overcome by providing a guide means which projects into the path of the magazine cover, and which at least is temporarily connected to the cover in a positive manner so that the film can be retracted without permitting the slide to move over the surface of the film and thereby scratch or mar the same during the removal of a magazine. In the present invention a cam plate is located adjacent the entrance slot of the closure plate so that when said closure plate is inserted, the edge will engage the cam surface and rock said plate about its axis which will automatically move the pressure plate to a retracted position within the magazine. Simultaneously, the film strip guided by the edges of the pressure plate will likewise be retracted such that the magazine slide cover will not engage the film or any portion thereof during its continued movement through its entrance slot in the magazine.

It is also contemplated in a modification to provide one or more spring fingers adapted to be engaged by the end of the magazine slide cover when the same is inserted in the entrance slot of the magazine so that said spring finger will be engaged by the cover and will move the closure plate rearwardly as well as the film strip.

In view of the fact that the pressure plate is mounted in the magazine in a floating manner, it is necessary to provide guide surfaces adjacent the picture window at the marginal edges thereof so that when said pressure plate is projected after being retracted, it will be properly alined with the picture window of the camera and held in true exposure position.

Other objects and advantages of the invention will become apparent during the course of the following description taken in connection with the accompanying drawings, wherein:

Figure 2 is a fragmentary cross-sectional view similar to Figure 1, but showing the magazine cover slide inserted and the film and film pressure plate in their retracted position within the removable magazine.

Figure 3 is a fragmentary longitudinal cross-sectional view of the camera embodying the present invention, showing the manner in which the magazine is formed to accommodate the film roll adjacent one end of the camera.

Figure 1:
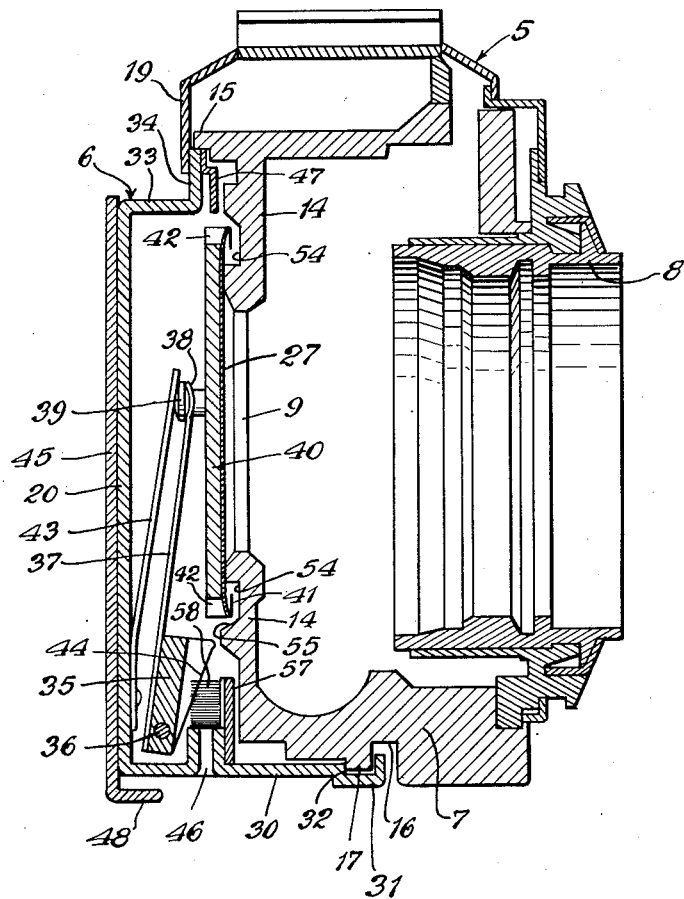
Figure 1 is a vertical cross-section view of the camera embodying the present invention showing the roll holding magazine removably affixed to the rear of the camera with the pressure plate and film in position for film exposure during the taking of pictures.

Figure 4 is a fragmentary transverse cross-sectional view similar to Figure 2, but showing a modified form of the invention in which the pressure plate is supported in the magazine by means of a leaf spring and is adapted to be retracted by means of a spring engageable with the front of the film and pressure plate when the cover slide is inserted so as to retract said film and pressure plate, and Figure 5 is an end elevational view of a magazine cover for sealing the magazine light-tight when the same contains a film having unexposed portions, and which has been previously removed from the camera.

In the drawings, wherein for the purpose of illustrating the invention and wherein like reference characters will be employed to designate like parts throughout the several views, attention is directed first to Figures 1 to 3 inclusive wherein there is shown a preferred embodiment of the invention, and wherein the reference character 5 will generally be employed to designate a roll film camera having a removable magazine likewise generally designated 6.

The camera 5 includes a casing 7 having an adjustable lens holder 8 for accommodating the objective lens system (not shown). The camera casing 7 is provided in its rear wall with a picture window 9 spaced a fixed distance with respect to the casing and arranged in alinement with the axis of the lens system of the camera. The end portions of the casing 10, one of which is shown in Figure 3, is cut away as at 11 to accommodate the magazine structure including the roll holding portions adjacent each end thereof. In addition, the casing 7 is shaped as at 12 to accommodate film feeding rollers 13. Since both ends of the camera are substantially the same in construction, a description of one end involving the structure 10, 11, 12 and 13 will suffice for both.

The rear wall 14 of the camera casing 7 is provided with a rib 15 to form an abutment shoulder for the magazine 6 and a groove 16 is formed on the underside of the camera to provide a rib 17. The end portions of the camera casing 7 in the area of the curved roll conforming portions 10 are slotted as at 18 to provide a magazine fastening rib. In addition, the camera casing is provided with a shell structure having a lip 19 extending downwardly in the rear portion of the camera to cooperate with the rib 15 and form a recess for receiving the upper edge of the magazine.

The magazine 6 includes a casing structure 20 forming a back wall for the camera 5 and the end portions of the casing structure 20 are provided with inclined portions 21 which terminate in ribs 22 adapted to be received in the slots 18. Secured to the underside of the inclined portions 21 (Fig. 3) are curved plates 23 for accommodating a picture strip roll 24. The inner edge of each of the curved portions 23 is shaped to provide a slot 25, and mounted adjacent the slot is a roller 26 adapted to guide the film strip 27. Normally, the film strip 27 will have its perforations received on the teeth of the feed sprocket 13 to permit the film strip to be rolled from one film roller to the other.

The lower wall 30 of the magazine is bent as at 31 to form a channel 32 for receiving the rib 17. Similarly, the top edge or wall 33 of the magazine is provided with an upstanding rib 34 which is adapted to be received between the camera casing 7 and the lip 19 so that the edge of the rib 34 will abut the projection or rib 15. The rib 17 and recess 32 is shaped to provide a snap fit to maintain the magazine 6 in position with respect to the camera casing 7.

Rockably mounted within the magazine 6 is a bar 35 which is mounted on a pivot pin 36 which has its ends supported at the ends of the magazine in a suitable manner (not shown). Secured to the bar 35 is an arm 37 which has its upper end bifurcated as at 38 to receive a pin 39 mounted on the back wall of a pressure plate 40. The pressure plate 40 is mounted on the arm 37 for removal to facilitate inserting the film edges beneath return bent guide members 41 on the film plate 40. It is noted that the upper and lower edges 42 of the plate 40 are slightly enlarged to provide forward inclined surfaces adjacent the marginal edges of the pressure plate 40.

One or more leaf springs 43 may have their ends connected to the magazine rear wall 6 to exert a spring pressure on the pin 39 and urge the pressure plate 40 forwardly.

The cam plate 35 is provided with a cam surface 44 which is adapted to be engaged by the edge of a cover plate 45 when the same is slid into position as shown in Figure 2. The lower wall 30 of the magazine is shaped to provide a slide cover entrance slot 46 so that the cover plate 45 may be inserted therein so that the leading edge will engage the cam surface 44 and cause the bar 35 to be rocked about its pivot point 36. This causes the pressure plate 40 to be retracted, and since the film strip 27 has its edges received under the guide ribs 41, the film strip is likewise retracted. Upon continued movement of the slide 45 through the entrance slot 46, the same will be positioned between the picture window 9 and the film strip 27 until the edge thereof is received between the lip 34 and a strip 47 connected to said lip 34. The lower end of the slide cover is bent as at 48 to provide a finger hold and the side edges of the slide cover 45 are bent as at 50 to provide ribs adapted to be slidably received in the slot 25 of the curved strip 23.

The rear wall 20 of the magazine 6 is provided with transversely extending slots 51 having restricting portions 52 for receiving the bent edges 53 (Fig. 3) of the closure slide 45.

In order to assure proper registration of the pressure plate 40 when the closure slide 45 is removed, the rear wall 14 of the camera casing is recessed as at 54 adjacent the upper and lower edges of the fixed picture window 9. The upper and lower edges of the grooves 54 are inclined as at 55 to form guide surfaces for the forwardly projecting edges of the guide plate 40 and insure the proper registration of said pressure plate with the picture window 9.

Mounted adjacent the entrance slot 46 is a strip 57 having a plurality of bristles 58 which extend across the slot 46 to normally close the same against the entrance of light and dust particles. When the closure slide 45 is inserted, the flexible bristles or pile fabric 58 are displaced as shown in Figure 2.

In the modified form of the invention shown in Figure 4 the back wall of the camera 14 is the same as before and the picture window 9 is adapted to be covered by a magazine casing 60 similar to the one previously described. The lower wall 61 of the magazine 60 is provided with an entrance slot 62 and the upper wall is ribbed as at 63 for reception in the frame part of the camera casing structure 7. A pressure plate 64 is yieldingly mounted in the magazine 60 and is supported on a leaf spring 65 which has one end attached to the inner surface of the rear wall of the magazine 60 by rivets 66, and its intermediate portion connected to the pressure plate 64 by suitable fastening means 67.

One or more springs 68 are mounted in the lower portion of the magazine 60 and are fastened in place as at 69 so that their free end as at 70 will extend in front of the pressure plate 64. The film strip 64' has its lower edge engaged by the free end 70 of the spring 68. Thus, when the slide closure 71 is inserted in the slot 62, the pile nap 72 will be displaced and the leading edge of the slide cover 71 will engage the spring 68 and retract the pressure plate 64. As the slide plate 71 is continued into the slot 62, the upper edge will come to rest within the groove 75 formed between the flange 63 and a strip 76 attached thereto. When the slide cover 71 is not in use, it is supported on the back wall of the magazine 60.

In order to protect the magazine 6 during storage when the same is charged with a roll film, a cover shown in Figure 5 is employed. The cover structure includes a body portion 80, the dimensions of which are similar to the casing structure 7 of the camera. The cover 80 is shaped to receive the roll holding portions 23 of the magazine 6 and the bottom wall is provided with a recess extending longitudinally on the underside of the cover as at 81. The cover 80 is substantially hollow for the major portion of its length, and as shown in the drawing the magazine is slid into position in the cover 80 in substantially the same manner in which it is received in the camera. A longitudinal slot 82 is formed in the body portion 80 for receiving the flange 34 (Fig. 5) on the upper wall 33 of the magazine 6 and it is pointed out that the offset portion 31 of the bottom wall 30 is received on a projection 84 similar to the projecting rib 17 on the camera casing. The front wall 85 of the cover is recessed as at 86 and is provided with a rib 87 to form a handle and enable the body portion 80 to be removed when it is desired to use the magazine in the camera 5.

It is to be understood that the forms of the invention herewith shown and described are to be taken as preferred embodiments and that various changes in the shape, size and arrangement of parts may be resorted to without departing from the spirit of the invention or the scope of the subjoined claims.

We claim:

1. A roll film camera comprising a camera casing having a rear wall provided with a picture window, a magazine removably attached to the rear wall of the camera adapted to hold a roll film strip, a pressure plate in said magazine arranged to engage said picture strip and position the same with respect to said window, a lever pivoted in said magazine for supporting said pressure plate, a detachable connection between said lever and plate, a cam on said lever, and a slide adapted to be inserted in said magazine so that the leading edge will engage said cam and move said pressure plate away from said window when the magazine is removed from said camera.

2. A roll film camera according to claim 1 wherein a light seal is provided to cover said slide opening and prevent the entrance of light into said magazine when the slide is removed.

3. A roll film camera according to claim 1 in which the cover slide is inserted in the magazine in a direction transverse to the direction of film strip feed.

References Cited in the file of this patent

UNITED STATES PATENTS

| | | |
|---|---|---|
| 1,804,680 | Fairchild | May 12, 1931 |
| 2,069,186 | Hineline | Jan. 26, 1937 |
| 2,319,530 | Bolsey | May 18, 1943 |
| 2,462,083 | Foster | Feb. 22, 1949 |